March 13, 1945.    O. J. E. OLSSON    2,371,465
WORK DRIVER
Original Filed Dec. 26, 1940
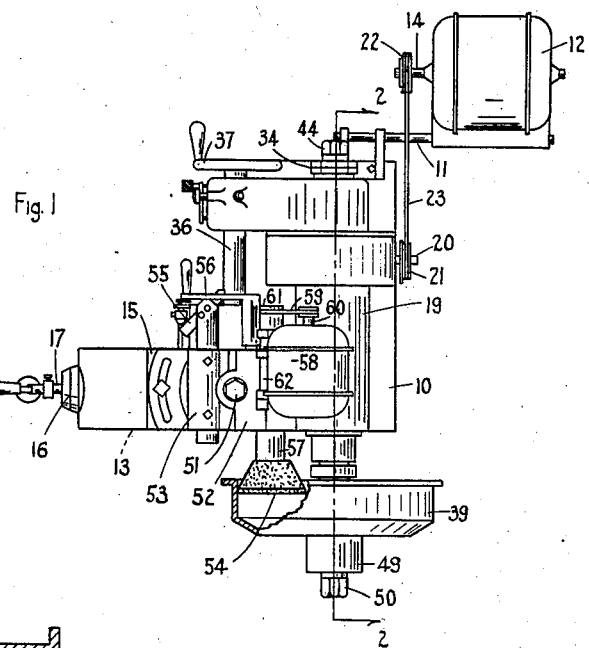
INVENTOR
OLOV. J. E. OLSSON
BY
G. H. Braddock
ATTORNEY Patented Mar. 13, 1945

2,371,465

UNITED STATES PATENT OFFICE 2,371,465

WORK DRIVER

Olov J. E. Olsson, Minneapolis, Minn., assignor to Storm Manufacturing Company, Inc., Minneapolis, Minn., a corporation of Minnesota Original application December 26, 1940, Serial No. 371,813. Divided and this application December 22, 1943, Serial No. 515,271

3 Claims. (Cl. 82—43)

This application is a division of my pending application Serial No. 371,813, for Machine for grinding and turning brake drums, filed December 26, 1940.

The invention here presented relates to a work driver, so-called.

An object of the invention is to provide a work driver of the present character which will be of novel and improved construction.

A further object is to provide a work driver wherein will be incorporated various improved features and characteristics of construction novel both as individual entities of the work driver and in combination with each other.

And a further object is to provide a work driver of construction as hereinafter set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawing forming a part of this specification,

Fig. 1 is a top plan view of a machine in which the features and characteristics of the invention are incorporated;

Fig. 2 is an enlarged sectional view of a work driver, or work drum support, of the machine of Fig. 1, taken substantially on line 2—2 in Fig. 1; and Fig. 3 is a view corresponding generally with the disclosure of Fig. 2, but showing a work driver, or brake drum support, of modified construction adapted to be employed in the machine of Fig. 1.

With respect to Figs. 1 and 2 of the drawing and the numerals of reference thereon, a frame for the machine, which is a grinding and turning machine, is denoted generally at 10. Said frame 10 rigidly supports an extension portion 11 of the frame which in turn rigidly supports an electric motor 12.

The frame 10 also supports a carriage 13 adapted to be reciprocated upon the frame in direction longitudinally thereof and transversely of the shaft 14 of the electric motor 12. More explicitly, said carriage 13 includes a base portion thereof slidably movable over an adjacent surface of the frame 10, and oppositely disposed, oblique or bevel flange portions thereof slidably movable over oblique or bevel surfaces of said frame 10 which are opposite said base portion and said frame surface. Stated otherwise, the oppositely disposed, oblique or bevel flange portions of said carriage 13 are spaced from the base portion of the carriage, as well as from each other, and extend inwardly in oblique or bevel relation to said base portion, to provide oppositely disposed guideways of the carriage 13 extending longitudinally of the frame of the machine in which opposite side edge portions of the frame 10 are snugly, slidably situated. The carriage 13 is adapted to be reciprocated longitudinally of the frame 10 by slidable movement of said carriage and its oppositely disposed guideways along the opposite side edge portions of said frame.

The carriage 13 supports a bracket member 15 adapted to be adjusted transversely of the frame 10 and perpendicularly to the direction in which said carriage is reciprocable along said frame. More explicitly, said bracket member 15 includes a base portion thereof slidably movable over an adjacent surface of the carriage 13, and oppositely disposed, oblique or bevel flange portions thereof slidably movable over oblique or bevel surfaces of said carriage which are opposite said base portion and the carriage surface. Stated otherwise, the oppositely disposed, oblique or bevel flange portions of the bracket member 15 are spaced from the base portion of said bracket member, as well as from each other, and extend inwardly in oblique or bevel relation to the base portion of the bracket member, to provide oppositely disposed guideways of said bracket member extending transversely of the carriage 13 in which opposite side edge portions of said carriage are snugly, slidably situated. The bracket member 15 is adapted to be adjusted transversely of the carriage 13 by slidable movement of said bracket member and its oppositely disposed guideways along the opposite side edge portions of said carriage.

Said bracket member 15 supports, or includes, several, or a number of, parts of the grinding and turning machine, and mechanism is included for accomplishing sliding adjustment of the bracket member, with parts supported thereby, transversely of the carriage, and for causing said bracket member to be secure at any position to which set crosswise of said carriage.

As disclosed, the bracket member 15 includes an integral arm 16 disposed perpendicularly to the base portion of said bracket member and situated adjacent the side portion of the carriage which is opposite the electric motor 12, in spaced relation to and alining relation with said carriage. An adjusting member or screw 17 is rotatably mounted and fixed against longitudinal movement in the arm 16, and an end portion of said adjusting member or screw 17 is threadably mounted in said side portion of said carriage opposite said electric motor. A slot (not shown) in the carriage 13 at the side of the last mentioned side portion of said carriage which is opposite the arm 16 provides clearance for relative movement of the carriage and the adjusting member or screw. Said adjusting member or screw 17 is arranged perpendicularly to said arm 16 and parallelly of, or in alinement with, the carriage 13, and the end portion of the adjusting member or screw 17 which is opposite the threaded end portion fixedly supports a hand piece 18 through the instrumentality of which said adjusting member or screw can be rotated, thus to accomplish adjustment of the bracket member 15 transversely of the frame 10 and the carriage 13. By turning adjustment of the member or screw 17 in one direction, it will be caused to move inwardly of the carriage, thus to cause the bracket member 15 to be adjusted inwardly, and by turning movement of said member or screw in opposite direction, it will be caused to move outwardly of said carriage, thus to cause said bracket member to be adjusted outwardly. Obviously, the bracket member 15 will be secured in fixed relation to the carriage at any location along the width of said carriage to which said bracket member may be adjusted.

A work driver, or mechanism for supporting and rotating a brake drum, or the like, to be ground and turned in the machine, is also included, as well as is mechanism for accomplishing reciprocation of the carriage 13, together with the bracket member 15 and the parts supported, or included, by said bracket member, upon the frame 10.

The driven shaft 14 of the electric motor 12 is at the side of the frame 10 and the carriage 13 which is opposite the hand piece 18. A gear casing 19, constituted as a part of the frame of the machine, suitably and conveniently rotatably supports a driving shaft 20 disposed transversely of said frame and parallelly of the motor shaft 14 in spaced relation to said motor shaft. An outer portion of the driving shaft 20 fixedly carries step pulleys 21 which are alined with step pulleys 22 fixed upon the motor shaft 14, and a belt 23 rides the pulleys 21 and 22 in customary fashion. An intermediate portion of said driving shaft 20 fixedly carries a worm 24 which meshes with a worm wheel 25.

A hollow work spindle 26 is suitably and conveniently rotatably mounted, as by Timken bearings 27, in the gear casing 19, and said hollow work spindle is suitably and conveniently fixed against endwise or longitudinal movement in said gear casing. Said worm wheel 25 is situated in the gear casing 19, and is keyed, as at 28, upon an inner reduced portion 29 of the hollow work spindle. A small gear 30, also keyed upon said hollow work spindle at 28, is situated at the side of the worm wheel 25 opposite the Timken bearings and in contiguous relation with a hub 31 integral with said worm wheel. A washer 32 is disposed between said worm wheel 25 and the adjacent Timken bearing 27, and a spacing sleeve 33 is slidably situated upon said reduced portion 29 of the hollow work spindle at the side of the small gear 30 which is opposite the hub 31. Lock nuts 34 adjacent the end of the spacing sleeve 33 opposite the small gear 30 and engaged with an external thread 35 upon the reduced portion 29 are adapted to be turned home against said spacing sleeve 33 thus to cause the worm wheel 25 and the hub thereon and the small gear 30 to be clamped against each other and between the washer 32 and the spacing sleeve 33 and said worm wheel and small gear to be fixed against movement longitudinally of the hollow work spindle 26, as will be apparent.

The small gear 30 is for driving a feed member or screw 36 of the machine which is suitably and conveniently rotatably mounted in the frame 10. Means (not shown) is provided for precluding longitudinal movement of the feed member or screw. Said feed member or screw 36 is disposed longitudinally of said frame 10 and includes an externally threaded portion thereof which meshes with an internally threaded portion of the carriage 13. The manner in which the feed member or screw is engaged with the carriage forms no part of the present invention.

Said feed member or screw 36 is adapted to be rotated in either direction, thus to cause the carriage 13 to be fed forwardly or rearwardly, as may be predetermined, through the instrumentality of gearing and clutch means, not necessary to be shown or described, interposed between the small gear 30 and the feed member or screw. The manner in which said feed member or screw is driven from said small gear 30 forms no part of the present invention.

A hand wheel 37 fixed upon a free end of the feed member or screw 36 at a side of the gear casing 19 which is opposite the carriage 13 is for accomplishing rotational actuation of said feed member or screw. The construction and arrangement will be such that the feed member or screw can be freely rotated in either direction through the medium of the hand wheel 37 when the clutch means, above mentioned, is in neutral position.

The Timken bearings 27 maintain the hollow work spindle 26 in exact parallel relation with the guideways provided by the carriage 13, as well as in precise parallel relation with the feed member or screw 36, at a side of said mentioned guideways and said feed member or screw. An arbor 38 for supporting a brake drum 39 to be ground and turned includes a circular, taper part 40 of said arbor adapted to be seated in a longitudinally disposed opening 41 through the hollow work spindle 26. More explicitly, a part 42 of the opening 41, defining the end portion of said opening opposite the worm wheel 25, has shape similar to that of the circular, taper part 40 of the arbor 38 to which said part 40 is adapted to be snugly fitted. A draw rod 43, including a head 44 at its outer end and an externally threaded portion 45 at its inner end portion, is for removably retaining the arbor 38 in rigid relation to the hollow work spindle 26. As disclosed, the draw rod 43 extends longitudinally through the opening 41, the externally threaded portion 45 of said draw rod is removably engaged with an internal thread 46 in the inner end of the arbor 38, and the head 44 of the draw rod is engaged against the end of the reduced portion 29 of the hollow work spindle 26 which is opposite the brake drum 39. Obviously, by turning the head 44 in one direction the arbor 38 can be made rigid with the hollow work spindle, and by turning said head 44 in opposite direction the draw rod 43 can be released from said arbor, thus to render the arbor removable from said hollow work spindle. When the head 44 of the draw rod is turned down against the reduced portion 29 of the hollow work spindle, the arbor 38 and said hollow work spindle evidently are secured to each other to be constituted as a unitary entity.

As disclosed, the brake drum 39 is rigidly secured upon the end portion of the arbor 38 which is opposite the hollow work spindle 26 by the employment of spaced apart collars 47 and 48 situated at and against the opposite end portions, respectively, of a hollow hub 49 of said brake drum. The collar 47 may be adjustable along and made secure with the arbor 38 in any suitable and convenient manner, and the collar 48 may be fastened against the hollow hub 49 by means of a nut 50 upon the outer end portion of the arbor 38.

The construction and arrangement will be such that when the nut 50 is turned home, said hollow hub 49 will be rigidly engaged by the collars 47 and 48 to cause the brake drum 39 to be rigidly supported upon the arbor 38 with its part to be ground and turned in precise concentric relation to said arbor and the hollow work spindle.

It will be apparent that with rotation of the hollow work spindle 26, by the electric motor 12 and through the instrumentality of a pulley 22, the belt 23, a pulley 21, the driving shaft 20, the worm 24 and the worm wheel 25, there will be rotation of the arbor 38 when rigid with said hollow work spindle and of the brake drum 39 when rigid with said arbor.

A cylindrical tool post having a clamping nut 51 upon the upper end thereof is situated at the midwidth of the bracket member 15 and is rotatably supported by said bracket member in upstanding, perpendicular relation to the bracket member. The manner in which the cylindrical tool post is supported upon the bracket member forms no part of the present invention.

A grinding tool holder of the machine is indicated at 52, and a turning tool holder is denoted at 53. The grinding tool holder and the turning tool holder are so mounted upon the cylindrical tool post that either the grinding tool 54 or the turning tool 55 selectively can be brought into engagement with the internal surface of a brake drum, such as 39, to be ground and turned.

The machine includes mechanisms, denoted generally at 56, for raising and lowering, or longitudinally moving, the grinding tool holder 52 along the cylindrical tool post. The just mentioned mechanism need not be specifically described. It is no part of the present invention.

A supporting shaft 57 for the grinding tool 54 is rotatably mounted upon the grinding tool holder 52, and is adapted to be rotated through the instrumentality of a second electric motor 58 suitably and conveniently supported upon said grinding tool holder 52. A belt 59 rides a pulley 60 fixed upon the shaft of the electric motor 58 and also rides a pulley 61 fixed upon said supporting shaft 57. A bracket 62 supports the electric motor 58 upon the grinding tool holder 52.

The electric motors 12 and 58 are adapted to be energized by current from a source (not shown) of electrical energy, and a circuit for said electric motors is adapted to include an on-and-off switch (not shown). The on-and-off switch is adapted to be operated both manually and automatically, in a manner forming no part of the present invention.

In Fig. 3 there is disclosed a work driver, or brake drum support, of modified construction adapted to be employed in the machine. Parts in said Fig. 3 similar to parts previously described bear the same reference numerals.

The gear casing 19 rotatably supports the hollow work spindle 26, as by Timken bearings 27, as before set forth. The worm wheel 25 and the small gear 30 are keyed to said hollow work spindle and are fixed against movement longitudinally of the hollow work spindle in the manner as hereinbefore stated.

An arbor 63 integral with a brake drum 64 to be ground and turned extends through a longitudinal opening 65 in the hollow work spindle 26. A compound clamp 66 includes a part 67 thereof releasably grasped upon the end portion of said hollow work spindle adjacent the brake drum 64 and opposite the worm wheel 25 and a part 68 thereof releasably grasped upon an enlarged portion 69 of the arbor 63 adjacent said brake drum. The compound clamp 66 is adapted to support the arbor 63 and the part of the brake drum 64 to be operated upon in exact concentric relation with the hollow work spindle 26. A hollow fitting 70 includes an annular portion 71 thereof removably fitted in the free end portion of the reduced portion 29 of the hollow work spindle 26, a flange portion 72 thereof adapted to be engaged against the free end of said reduced portion 29, and an annular externally threaded portion 73 thereof at the outer side of said flange portion 72. The end portion of the arbor 63 opposite the brake drum 64 passes snugly through the hollow fitting 70. A nut 74 includes an internal thread adjustably engaging the external thread upon the annular portion 73, and a split washer 75 is adapted to be removably situated in an annular groove 76 in the free end portion of the arbor 63, between a head 77 of said arbor and the adjacent surface of the nut 74. The portion of the arbor 63 at the side of the enlarged portion 69 of said arbor opposite the brake drum 64 is, in fact, constituted as a draw rod of and for said arbor. Evidently, by turning the nut 74 outwardly on the annular externally threaded portion 73 and against the split washer 75, the arbor 63 can be drawn in direction to bring an internal surface of the compound clamp 66 into pressing engagement with the adjacent end of the hollow work spindle 26 to make said arbor rigid with said hollow work spindle, and by turning said nut inwardly on said annular portion 73 and away from said split washer, the split washer can be released for removal from the annular groove 76, thus to render the arbor 63 removable from the hollow work spindle. When the nut 74 is in pressing engagement with the split washer 75, the arbor 63 and said hollow work spindle are secured to each other to be constituted as a unitary structure.

What is claimed is:

1. In combination, a frame, a support for an article to be operated upon consisting of a hollow work spindle rotatably mounted on said frame, an arbor rigid with said article, a draw rod in said hollow work spindle and secured to said arbor, said draw rod having a head thereon and the end portion of the draw rod having said head extending beyond an end of said hollow work spindle, and a take-up for causing said arbor to be made rigid with an end portion of said hollow work spindle, said take-up being constituted by said draw rod, a hollow fitting on said draw rod having a portion thereof engaged against an end of said hollow work spindle and an externally threaded portion, a nut upon said externally threaded portion of said hollow fitting, and a split washer upon said draw rod and removably situated between said nut and the head of said draw rod.

2. In combination, a frame, a support for an article to be operated upon consisting of a hollow work spindle rotatably mounted on said frame, a driving shaft for said hollow work spindle, a worm on said driving shaft, a worm wheel meshing with said worm and fixed on said hollow work spindle, means fixing said hollow work spindle against longitudinal movement, an arbor rigid with said article, a draw rod in said hollow work spindle and rigid with said arbor, said draw rod having a head thereon and the end portion of the draw rod having said head extending beyond an end of said hollow work spindle, and a take-up constituted in part by said draw rod and its head for causing the arbor to be made rigid with a part of the hollow work spindle which is adjacent said arbor.

3. In combination, a frame, a support for an article to be operated upon consisting of a hollow work spindle rotatably mounted on said frame, means fixing said hollow work spindle against longitudinal movement, a worm wheel and a gear keyed upon said hollow work spindle for movement longitudinally of the hollow work spindle, means including a spacing sleeve and a lock nut upon said hollow work spindle for fixing said worm wheel and gear against longitudinal movement on the hollow work spindle, an arbor rigid with said article, a draw rod in said hollow work spindle and rigid with said arbor, said draw rod having a head thereon and the end portion of the draw rod having said head extending beyond an end of said hollow work spindle, and a take-up constituted in part by said draw rod and its head for causing the arbor to be made rigid with said hollow work spindle.

OLOV J. E. OLSSON.